FREQUENCY MODULATING SYSTEM FOR CRYSTAL OSCILLATORS

Filed Oct. 31, 1956

Inventors
David I. Kosowsky
Robert W. Luscher
by Robert S. Topezer Atty.

2,913,677
Patented Nov. 17, 1959

2,913,677

FREQUENCY MODULATING SYSTEM FOR CRYSTAL OSCILLATORS

David I. Kosowsky, West Newton, and Robert W. Luscher, Belmont, Mass., assignors to Hermes Electronics Co., Boston, Mass., a corporation of Delaware Application October 31, 1956, Serial No. 619,574
1 Claim. (Cl. 332—26)

Figure 1:
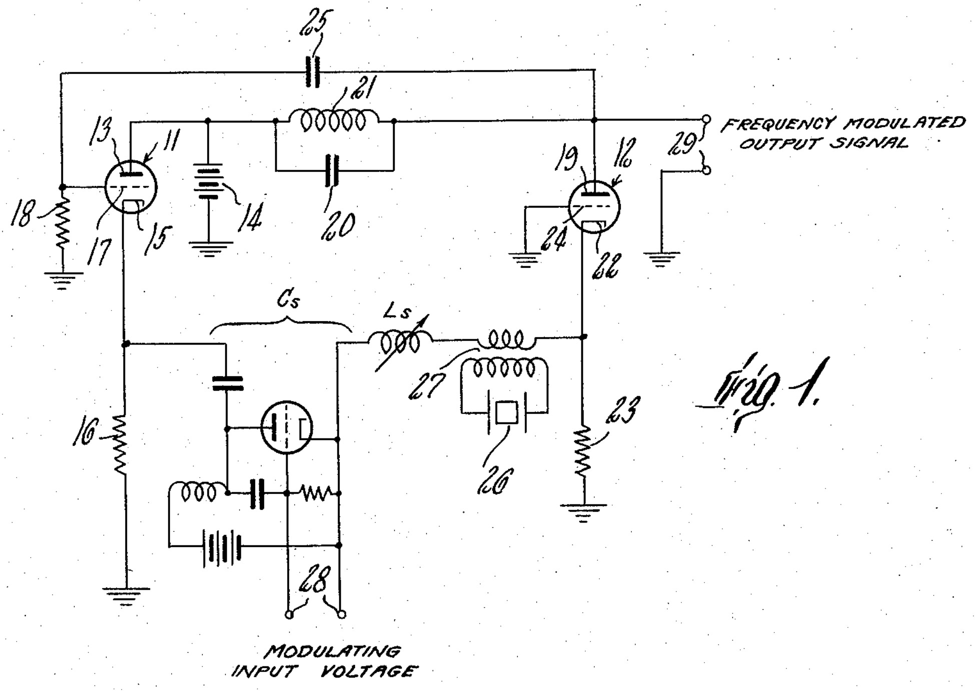

This invention relates generally to crystal oscillators and more particularly it relates to systems for injecting a modulating signal into a crystal oscillator circuit to modulate the frequency of the oscillator.

It is an object of the invention to provide a system of the above-mentioned character which is not appreciably more complex than an amplitude modulating system, permitting the advantages of frequency modulation to be realized in many crystal controlled transmitter applications where hitherto the use of frequency modulation has been precluded because of the added complexity and bulk of the equipment. This is especially true of equipment designed for portable use.

Figure 2:
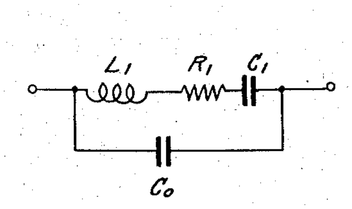

The novel features of the invention, together with further objects and advantages thereof, will become more readily apparent from the following detailed description of a preferred embodiment of the invention illustrated in the accompanying drawing. In the drawing:

Fig. 1 is a schematic diagram of an illustrative crystal oscillator which is frequency modulated in accordance with the invention; and Fig. 2 is an equivalent circuit diagram of a piezoelectric crystal such as the crystal employed in the oscillator of Fig. 1.

With reference first to Fig. 1, it will be observed that the frequency modulating system of the present invention has been applied by way of illustration to a conventional series mode oscillator of the type often referred to by those skilled in the art as the Butler oscillator or Butler circuit. Briefly as shown in Fig. 1, this type of oscillator comprises a pair of triode electron discharge devices 11 and 12, one of which (11) is operated as a cathode follower stage, and the other of which (12) is operated as a grounded grid amplifier stage. To this end triode 11 has its anode 13 connected to a source of anode voltage 14, and its cathode 15 connected through a cathode resistor 16 to a common point or ground as established by the negative terminal of the source 14, the control electrode 17 of the triode 11 being referred to ground through a grid resistor 18. Triode 12, on the other hand, has its anode 19 connected to the source of anode voltage 14 through a parallel resonant circuit formed with a capacitor 20 and an inductor 21, and its cathode 22 connected to ground through a cathode resistor 23, the control electrode 24 of triode 12 being connected directly to ground. The feedback loop relating the individual stages is formed with a capacitor 25 connected between the anode of triode 12 and the control electrode of triode 11, and a circuit interconnecting the respective cathodes of the triodes. According to the invention this latter circuit includes an inductor $L_s$, and the output circuit of a capacitive reactance tube network which is adapted to resonate with $L_s$ at the crystal resonant frequency $f_a$, and which is characterized in the drawing by its equivalent output reactance $C_s$. The crystal 26 to control the center frequency of the oscillator is connected across the secondary winding of a transformer 27 whose primary winding is in series with the inductor $L_s$ and the equivalent reactance $C_s$. As will be apparent to those skilled in the art, the reactance tube network is of a conventional type, and functions to provide an instantaneous value of $C_s$ in its output circuit which depends upon the instantaneous amplitude of a modulating voltage applied to its input terminals 28.

In operation, the overall circuit including the inductor $L_s$, the equivalent reactance $C_s$, and the primary winding of transformer 27 may be characterized as a modulating reactance circuit because of its function. That is to say, the frequency of the output signal appearing at the oscillator output terminals 29 will be dependent upon the instantaneous reactance of this circuit which in turn depends on the value of the equivalent reactance $C_s$ established by the reactance tube, and on the reactance value assumed by the crystal at any given operating frequency. Accordingly, when the input voltage to the reactance tube is varied, thereby varying the equivalent reactance $C_s$, a corresponding variation in oscillator frequency takes place during which the crystal assumes a new reactance value consistent with the overall conditions required to support oscillation at the new oscillator frequency. The resonant anode circuit of triode 12 comprising capacitor 20 and inductor 21 insures that throughout the range of oscillator output signal frequencies produced by the modulating input voltage, the crystal will oscillate in its proper mode.

Although it would be theoretically possible to connect the crystal 26 directly in circuit with the inductor $L_s$ and the equivalent reactance $C_s$, such an arrangement would not be practical in many applications for two reasons. First of all, the maximum deviation from the center frequency that could be obtained without exceeding the range of linear response of output frequency to input voltage would be severely limited by the small separation $S_a$ of the resonant and antiresonant frequencies of the crystal. It can be shown that the resonant frequency $f_a$ and antiresonant frequency $f_b$ are related by the formula $$f_b^2 = f_a^2\left(1+\frac{1}{r}\right)$$

where $$r \equiv \frac{C_0}{C_1}$$

In general, $r$ can be no smaller than approximately 125. According to the above equation therefore, this establishes the maximum value of $S_a$ at approximately 0.4 percent of $f_a$, and since the crystal impedance is reasonably linear only over a part of the range defined by this value of $S_a$, it follows that the permissible deviation from the center frequency or swing would be too small to be useful in most cases. Second, but none the less important, is the limitation imposed on the maximum frequency deviation by the series inductance value $L_1$ of the crystal. With reference to the crystal equivalent circuit as shown in Fig. 2, it is apparent that the higher the value of the inductance $L_1$, the steeper will be the slope of the reactance characteristic of the crystal as a function of frequency. Since the value of $L_1$ associated with most crystals, or at least those manufactured by ordinary techniques, is relatively high, it follows that their impedance increases radically when the frequency of the signal applied thereto departs even a small amount from the crystal resonant frequency $f_a$. If the crystal 26 of Fig. 1 were coupled directly into the modulating reactance circuit, therefore, rather than through the transformer 27, an inordinately large change in the output reactance of the reactance tube would be required to counteract the variation in crystal reactance with frequency so that enough frequency swing could be produced to satisfy the requirements of most systems.

By means of transformer 27, however, both of these difficulties are overcome. Specifically, the secondary winding of transformer 27 is designed to resonate with the crystal shunt capacitance $C_0$ (Fig. 2) at the resonant frequency of the crystal. This increases the separation $S_a$ between resonant and antiresonant frequencies and at the same time produces antiresonance below the resonant frequency $f_a$ so that the reactance characteristic of the crystal is made more nearly symmetrical. Consequently, the frequency range throughout which the crystal reactance is a linear function of frequency is greatly increased. As a practical matter, the crystal holder and leads will also give rise to a significant amount of shunt capacitance which must be considered as a part of $C_0$ in the selection of the proper value of transformer secondary inductance to resonate with $C_0$.

The turns ratio $n$ for the transformer is selected with regard to the maximum reactance variation of $C_s$ which can be conveniently produced by the reactance tube, and the maximum frequency deviation desired in response to such reactance variation. Thus, the crystal inductance $L_1$ as it is reflected in the modulating circuit is determined by the turns ratio $n$, and in particular it has the reflected or transformed value $$\frac{L_1}{n^2}$$

Since the other circuit constants in the equivalent circuit of Fig. 2 are likewise transformed, the overall effect is that the crystal impedance, as it appears to the frequency modulating circuit is reduced by the factor $$\frac{1}{n^2}$$

This permits the conditions necessary to support oscillation to be established at any given frequency off the crystal resonant frequency with a correspondingly smaller change in the reactance tube output reactance $C_s$. Conversely, when the reactance $C_s$ is varied a maximum amount, a correspondingly larger maximum frequency deviation will be produced.

It should be understood, however, that the system according to the present invention is in no way limited to the use of a reactance tube alone to provide a modulating reactance. For example, the inductor $L_s$ may comprise a saturable reactor to which a modulating control voltage is applied in which case the reactance tube network would be replaced by a suitable capacitor. Similarly, transmission line devices, mechanically variable inductors or capacitors, or even semiconductor devices might be used to perform the modulating reactance function. In the case of some of these modulating reactance devices at least, it will be possible to produce a relatively larger reactance variation than can be produced with a reactance tube network. Under these circumstances, it should also be understood that transformer 27 may be replaced by a simple inductor having the proper value of inductance to resonate with the shunt capacitance $C_0$ of the crystal at the crystal resonant frequency. The same will generally be true where a low inductance crystal is available or of course where very little frequency deviation is required in the first place. Various such modifications that lie within the spirit and scope of the invention will no doubt occur to those skilled in the art, and therefore the invention should not be deemed to be limited to the embodiment illustrated herein by way of example, but should be deemed to be limited only by the scope of the appended claim.

What is claimed is:

A frequency modulating system for a feedback oscillator adapted to be controlled in frequency by a piezoelectric crystal, said modulating system including a transformer having its secondary winding connected to the crystal and its primary winding connected in the feedback loop of said oscillator, said primary winding having appreciably fewer turns than said secondary winding, a reactance tube having an input circuit for a modulating voltage and an output circuit whose reactance varies as a substantially linear function of said modulating voltage, a reactive element to resonate with the reactance of said output circuit at the crystal resonant frequency, said output circuit and said reactive element being coupled in a series circuit with said primary winding to provide in combination with the transformed crystal reactance a reactance which varies as a function of said modulating voltage, and said secondary winding providing in circuit with the crystal an inductance to resonate with the crystal shunt capacitance at the resonant frequency of the crystal.

References Cited in the file of this patent

UNITED STATES PATENTS

| | | |
|---|---|---|
| 2,163,403 | Meacham | July 2, 1937 |
| 2,598,722 | Richards | June 3, 1952 |
| 2,683,252 | Gordon | July 6, 1954 |

FOREIGN PATENTS

| | | |
|---|---|---|
| 258,946 | Great Britain | Oct. 1, 1926 |
| 671,194 | Great Britain | Apr. 30, 1952 |
| 750,987 | France | June 12, 1933 |
| 907,190 | Germany | Mar. 22, 1954 |